United States Patent
Yaffe et al.

(10) Patent No.: US 7,698,443 B2
(45) Date of Patent: Apr. 13, 2010

(54) MULTI-PROTOCOL AUTHENTICATION AND AUTHORIZATION IN COMPUTER NETWORK ENVIRONMENTS

(75) Inventors: Dror Yaffe, Gan Yavne (IL); Michael Gilfix, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 11/366,028

(22) Filed: Mar. 2, 2006

(65) Prior Publication Data

US 2007/0208866 A1    Sep. 6, 2007

(51) Int. Cl.
G06F 15/16    (2006.01)
(52) U.S. Cl. .............................. 709/229; 709/200; 726/4
(58) Field of Classification Search ................. 709/200, 709/229, 227; 726/2, 27, 4, 5
See application file for complete search history.

(56) References Cited

U.S. PATENT DOCUMENTS

| | | | |
|---|---|---|---|
| 6,996,076 B1 * | 2/2006 | Forbes et al. ................ | 370/310 |
| 2002/0053032 A1 * | 5/2002 | Dowling et al. ............. | 713/201 |
| 2004/0097188 A1 | 5/2004 | Tanimoto | |
| 2004/0123232 A1 | 6/2004 | Hodges et al. | |
| 2004/0225878 A1 | 11/2004 | Costa-Requena et al. | |
| 2005/0044233 A1 | 2/2005 | Cai et al. | |
| 2005/0091362 A1 | 4/2005 | Shigeta et al. | |
| 2005/0154886 A1 | 7/2005 | Birk et al. | |
| 2006/0029104 A1 * | 2/2006 | Jungck ........................ | 370/498 |
| 2007/0022289 A1 * | 1/2007 | Alt et al. ..................... | 713/168 |
| 2007/0038757 A1 * | 2/2007 | Raju ........................... | 709/227 |

FOREIGN PATENT DOCUMENTS

JP    11177694    7/1999

* cited by examiner

*Primary Examiner*—Salad Abdullahi
*Assistant Examiner*—El Hadji M Sall

(57) ABSTRACT

A multi-protocol authentication and authorization system including a request interceptor configured to receive from a requestor a first request using a first transport protocol and a second request using a second transport protocol, and an authenticator for validating a digest received from the requestor, where the request interceptor is configured to authenticate the requestor if the digest is valid and if at least one multi-protocol criterion applied to the requests is met.

9 Claims, 5 Drawing Sheets

MULTI-PROTOCOL AUTHENTICATION AND AUTHORIZATION IN COMPUTER NETWORK ENVIRONMENTS

FIELD OF THE INVENTION

The present invention relates to computer networks in general, and more particularly to authorizing requests carried by different computer network protocols.

BACKGROUND OF THE INVENTION

In many computer network environments, requests sent by a computer-based client application to an application server, such as requests to access a software application, require that the request be authenticated before the request is authorized. Such requests and their attendant responses are conveyed in accordance with a transport protocol, such as the Hypertext Transport Protocol (HTTP). The requests themselves are typically received at a request interceptor, whose job it is to receive requests, assist in request authentication and authorization, and forward authenticated and authorized requests to the requested applications. With the emergence of new protocols, such as the Session Initiation Protocol (SIP), the request interceptor must be adapted to support them, or new, protocol-specific request interceptors must be provided. Techniques for efficiently handling multi-protocol authentication and authorization in computer network environments would be advantageous, as would be techniques that take advantage of multi-protocol requests to provide new authentication and authorization paradigms.

SUMMARY OF THE INVENTION

The present invention discloses a system and method for multi-protocol authentication and authorization system in a computer network environment.

In one aspect of the present invention a multi-protocol authentication and authorization system is provided including a request interceptor configured to receive from a requestor a first request using a first transport protocol and a second request using a second transport protocol, and an authenticator for validating a digest received from the requestor, where the request interceptor is configured to authenticate the requester if the digest is valid and if at least one multi-protocol criterion applied to the requests is met.

In another aspect of the present invention the request interceptor is configured to authenticate one of the requests only subsequent to authenticating the other of the requests.

In another aspect of the present invention a multi-protocol authentication and authorization system is provided including a request interceptor configured to receive from a requestor a first request using a first transport protocol and a second request using a second transport protocol, and an authenticator for validating a digest received from the requestor, where the request interceptor is configured to authenticate the requester if the digest is valid, and where the request interceptor is configured to authorize the requestor to access a requested application if at least one multi-protocol criterion applied to the requests is met. In another aspect of the present invention the request interceptor is configured to constrain the requester to one role in the requested application where the requestor is authenticated for only one of the requests, and a different role where the requester is authenticated for only the other of the requests.

In another aspect of the present invention the request interceptor is configured to constrain the requestor to one role in the requested application where the requester is authenticated for only one of the requests, and a different role where the requester is authenticated for both of the requests.

In another aspect of the present invention the request interceptor is configured to constrain the requestor to one role in the requested application where the requests are made at different times not within a predefined time window, and a different role where the requests are made within a predefined time window.

In another aspect of the present invention a request interceptor architecture is provided including a plurality of protocol interfaces, each protocol interface configured to provide an execution point for requests based on different protocols, and to apply protocol-dependent logic to the requests, a shared memory via which the protocol interfaces are configured to share information relating to the processing of the requests, and to which multi-protocol logic is applicable, and a base class embodying protocol-independent logic applicable to the requests.

In another aspect of the present invention each of the protocol interfaces interacts with a request of a different protocol independently from any other of the protocol interfaces.

In another aspect of the present invention a method is provided for multi-protocol authentication and authorization, the method including receiving from a requester a first request using a first transport protocol and a second request using a second transport protocol, validating a digest received from the requestor, and authenticating the requestor if the digest is valid and if at least one multi-protocol criterion applied to the requests is met.

In another aspect of the present invention the authenticating step includes authenticating one of the requests only subsequent to authenticating the other of the requests.

In another aspect of the present invention a method is provided for multi-protocol authentication and authorization, the method including receiving from a requestor a first request using a first transport protocol and a second request using a second transport protocol, validating a digest received from the requester, authenticating the requestor if the digest is valid, and authorizing the requestor to access a requested application if at least one multi-protocol criterion applied to the requests is met. In another aspect of the present invention the authorizing step includes constraining the requestor to one role in the requested application where the requester is authenticated for only one of the requests, and a different role where the requestor is authenticated for only the other of the requests.

In another aspect of the present invention the authorizing step includes constraining the requestor to one role in the requested application where the requestor is authenticated for only one of the requests, and a different role where the requestor is authenticated for both of the requests.

In another aspect of the present invention the authorizing step includes constraining the requestor to one role in the requested application where the requests are made at different times not within a predefined time window, and a different role where the requests are made within a predefined time window.

In another aspect of the present invention a computer-implemented program is provided embodied on a computer-readable medium, the computer program including a first code segment operative to receive from a requestor a first request using a first transport protocol and a second request using a second transport protocol, a second code segment operative to validate a digest received from the requestor, a third code segment operative to apply at least one multi-protocol criterion applied to the requests, and a fourth code segment operative, if the digest is valid and the criterion is met, to perform any of a) authentication of the requestor and b) authorization of the requestor to access a requested application.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Figure 1:
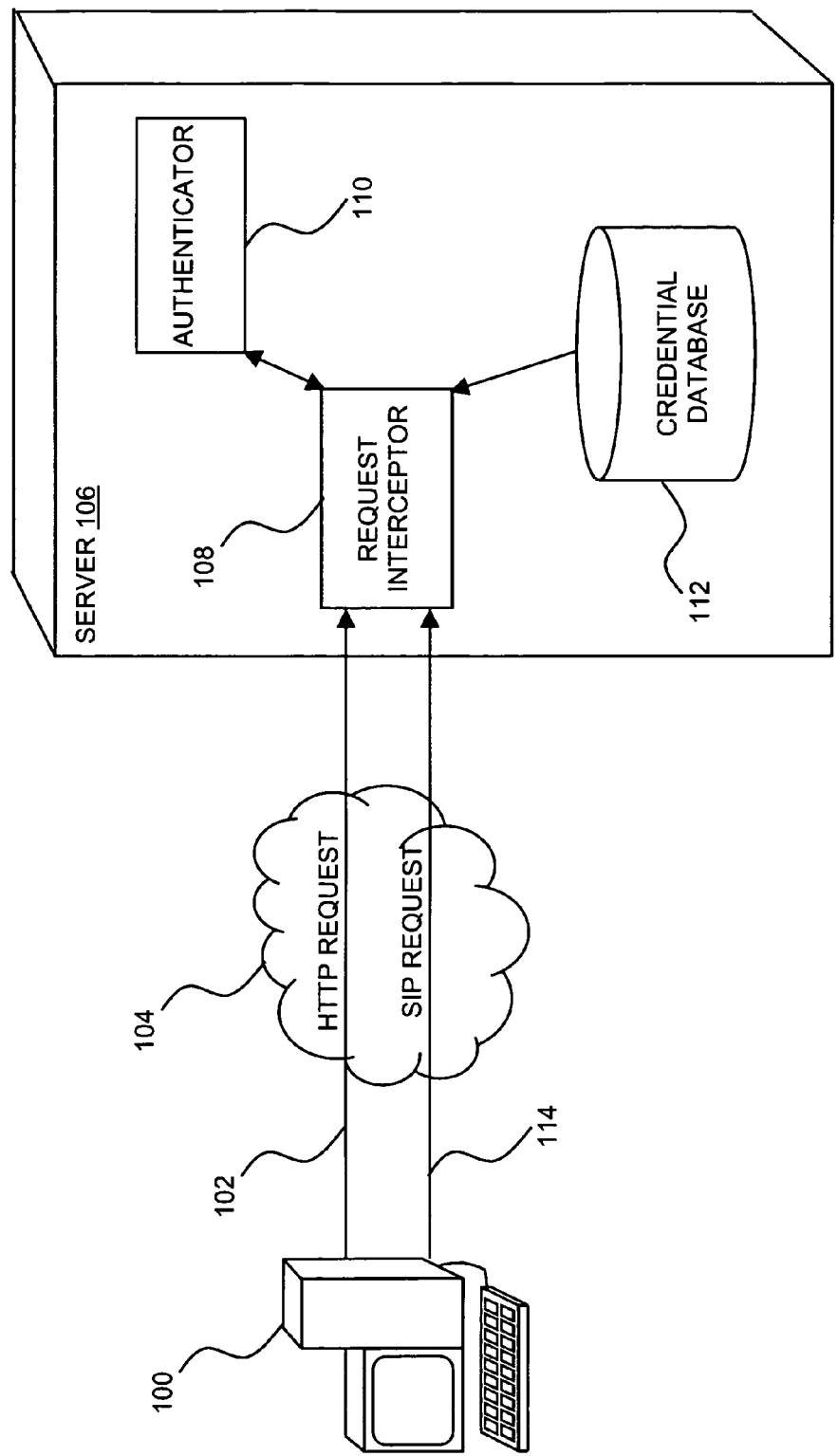
FIG. 1 is a simplified conceptual illustration of a multi-protocol authentication and authorization system constructed and operative in accordance with a preferred embodiment of the present invention.
Figure 2A:
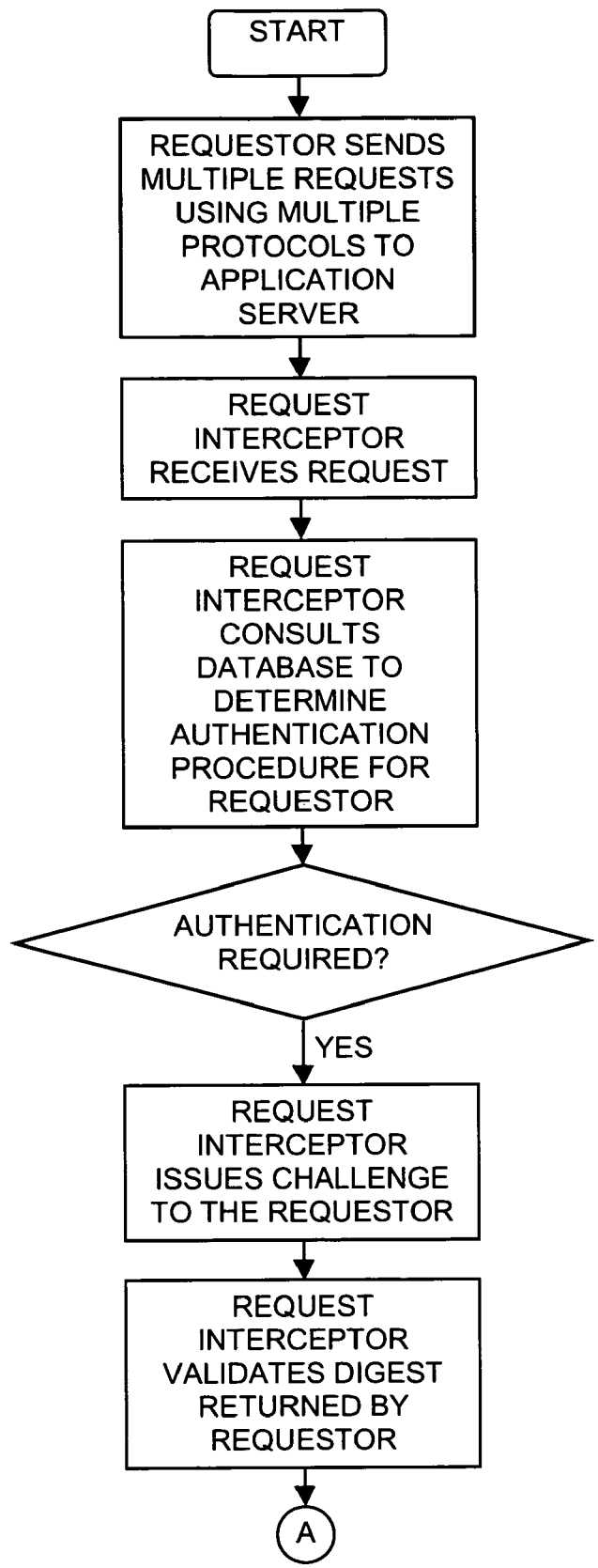
FIGS. 2A and 2B, taken together, is a simplified flowchart illustration of an exemplary method of operation of the system of FIG. 1, operative in accordance with a preferred embodiment of the present invention.
Figure 2B:
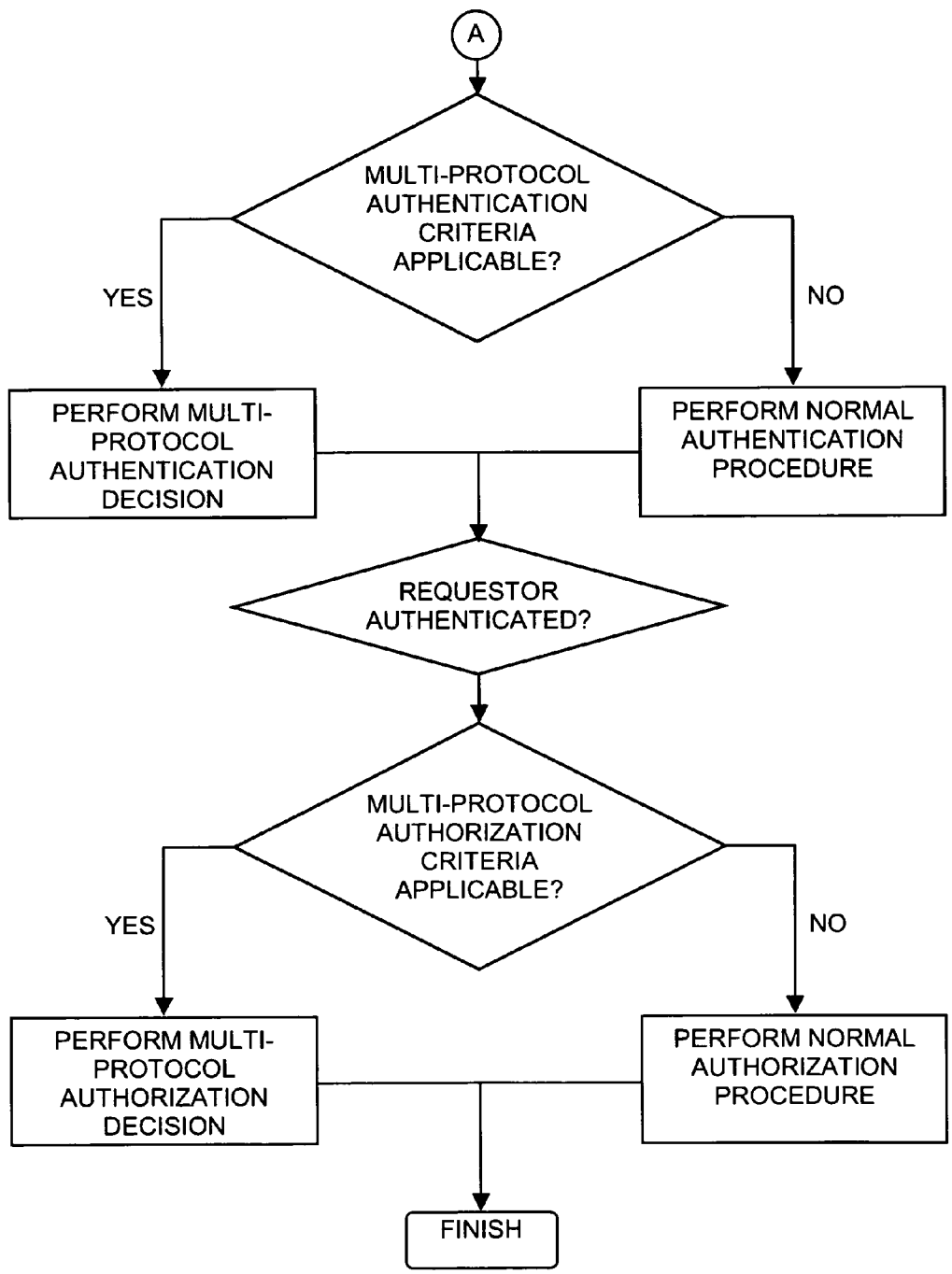

Reference is now made to FIG. 1, which is a simplified conceptual illustration of a multi-protocol authentication and authorization system, constructed and operative in accordance with a preferred embodiment of the present invention, and additionally to FIGS. 2A and 2B, which, taken together, is a simplified flowchart illustration of an exemplary method of operation of the system of FIG. 1, operative in accordance with a preferred embodiment of the present invention. In the system and method of FIGS. 1 and 2A-2B, a requester, via a computer-based client application 100, sends a request 102, such as an HTTP-based request, via a network 104, such as the Internet, to a server 106, which may be an application server such as the WebSphere™ Application Server commercially-available from International Business Machines Corporation, Armonk, N.Y., USA. Request 102 is received at server 106 by a request interceptor 108, such as the WebSphere™ Trust Association Interface™ (TAI), which manages the request authentication process, such as via an authenticator 110. Using conventional techniques, request interceptor 108 preferably consults a database 112 to determine whether the requester is known, and whether the request is to be trusted as-is, or whether a challenge is to be issued. If the latter, request interceptor 108 issues the challenge to the requester, asks authenticator 110 to validate the digest returned by the requester, and authenticates the request if the digest is valid.

In accordance with the present invention, request interceptor 108 may likewise authenticate a request 114 received from client 100 and that is based on a different protocol, such as SIP. It is appreciated that request interceptor 108 may be configured to receive and authenticate requests from multiple protocols.

Once a request has been authenticated, request interceptor 108 authorizes the request, such as by determining whether the request is to be forwarded to the requested application, and, if so, what level of access to the requested application the requestor is to receive. For example, in the Java™ 2 Platform, Enterprise Edition (J2EE™), commercially available from Sun Microsystems, Inc., Santa Clara, Calif., USA, one or more roles are defined for an application, where activity may be constrained based on the role that an authenticated requester has been given. For example, users in a manager role might be able to delete inventory, while users in an employee role might not.

In accordance with the present invention, where the same requestor sends different requests to server 106 using different protocols, such as HTTP and SIP, multi-protocol authentication decisions and/or authorization decisions may be made using multi-protocol criteria that take into account the very fact that different requests may be made using different protocols. For example, request interceptor 108 might not authenticate a SIP-based request unless the requestor has been authenticated for an HTTP-based request. Similarly, request interceptor 108 might constrain the authenticated requestor to one role where the requestor is authenticated for both HTTP-based and SIP-based requests, and a different role where the requestor is authenticated for an HTTP-request only, and yet another role where the requester is authenticated for an SIP-request only. Different roles may also be assigned based on whether multiple requests using multiple protocols are made simultaneously (i.e., within a predefined time window) or at different times.

Figure 3:
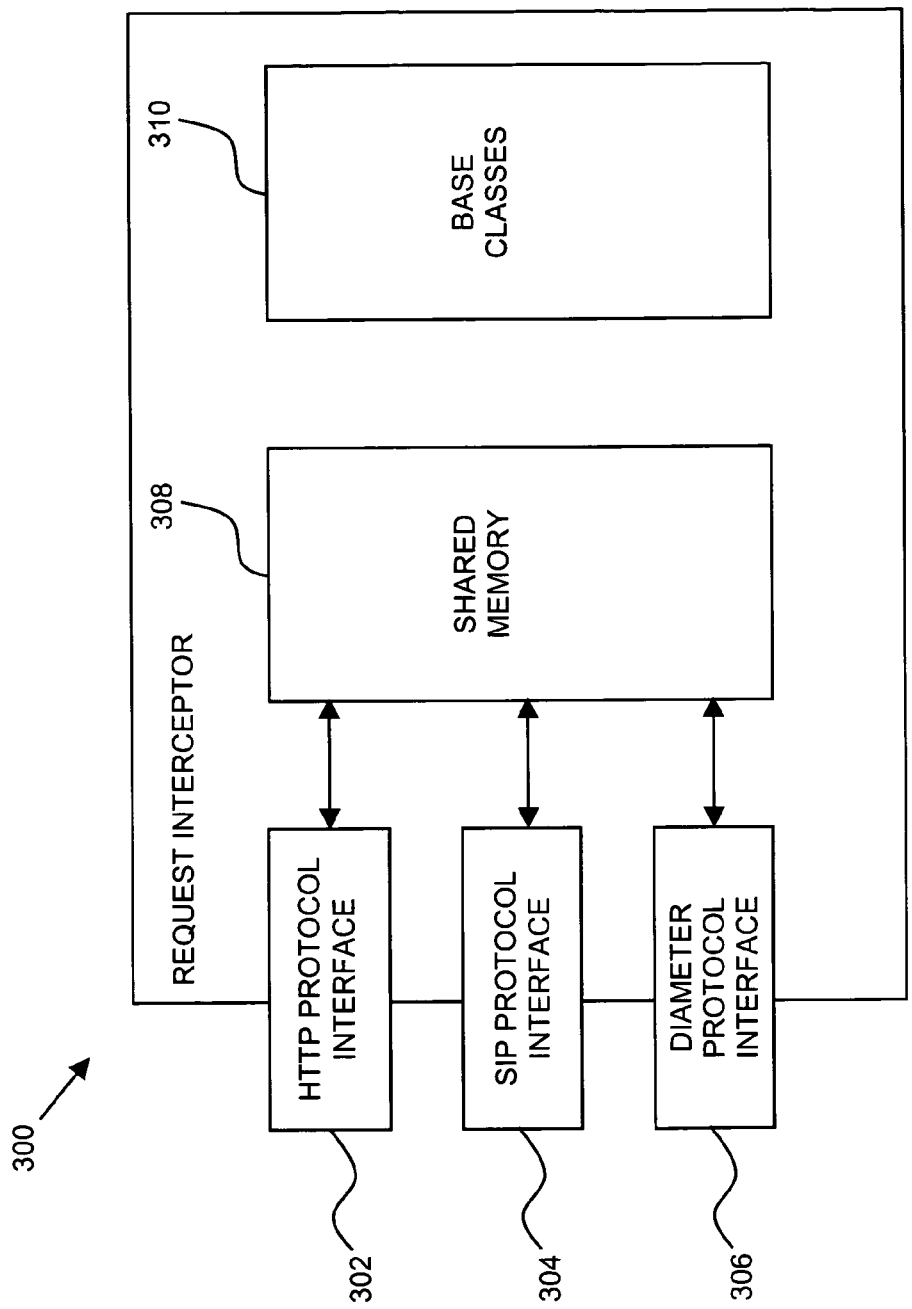
FIG. 3 is a simplified conceptual illustration of a request interceptor architecture, constructed and operative in accordance with a preferred embodiment of the present invention.

Reference is now made to FIG. 3, which is a simplified conceptual illustration of a request interceptor architecture, constructed and operative in accordance with a preferred embodiment of the present invention. In FIG. 3 a request interceptor 300 is shown having multiple protocol interfaces 302, 304, and 306, each providing execution points for requests based on different protocols, such as HTTP, SIP, and Diameter. A shared memory 308 is preferably provided whereby protocol interfaces 302, 304, and 306 may share information relating to the processing of requests, and to which multi-protocol logic may be applied as described hereinabove. Each of protocol interfaces 302, 304, and 306 is independently responsible for managing the authentication and authorization of requests based on its protocol. Base classes 310 are provided embodying protocol-independent logic to complement the protocol-dependent logic of protocol interfaces 302, 304, and 306. Thus, while each protocol is provided with its own execution points as it interfaces with request interceptor 300, a multi-protocol view may be provided by allowing each protocol to interact independently with request interceptor 300, while providing a shared environment linking the individual protocol interfaces to each other, as well as to protocol-independent logic.

Figure 4:
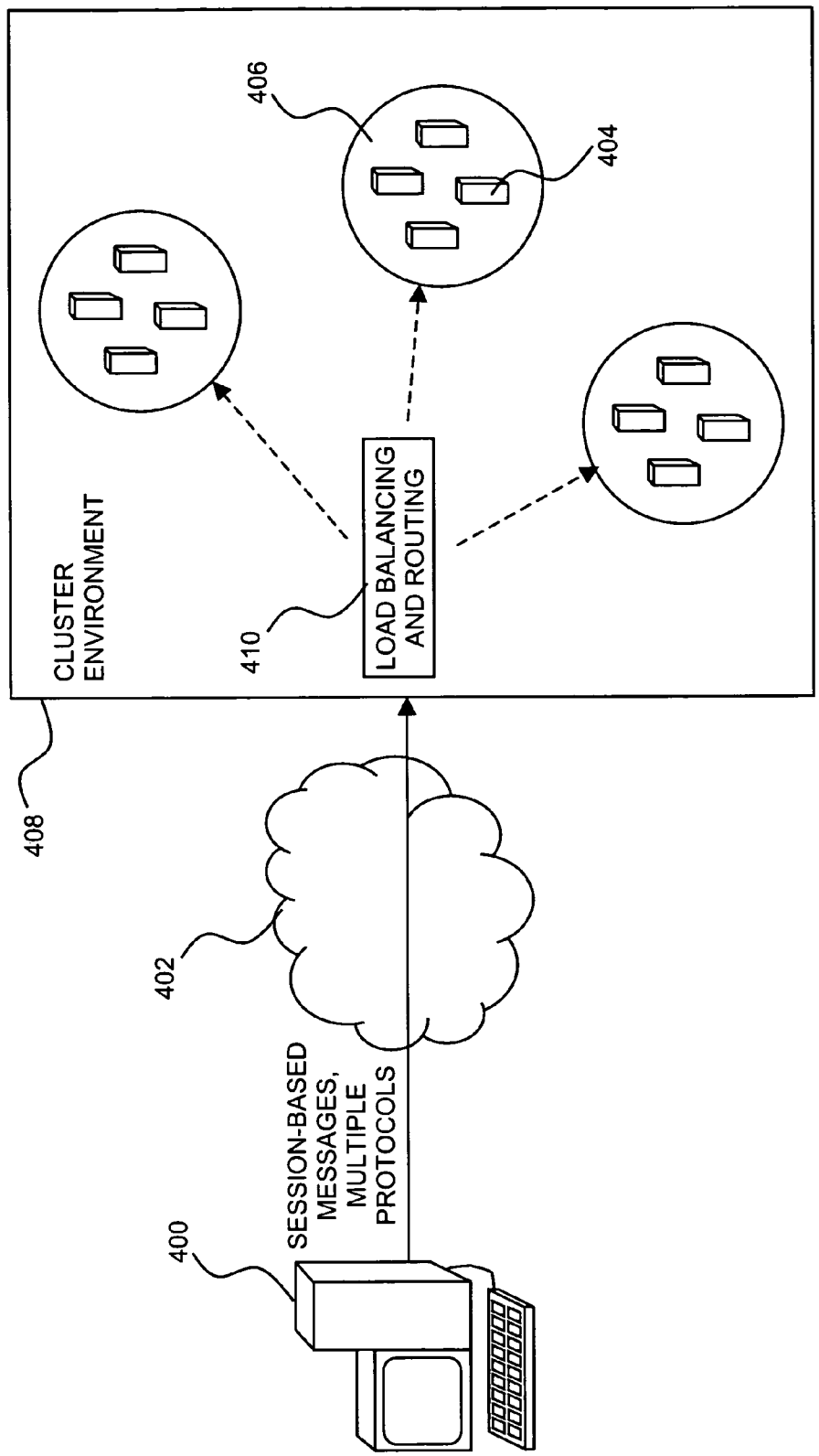
FIG. 4, which is a simplified conceptual illustration of the multi-protocol authentication and authorization system of the present invention implemented as part of a converged application environment, constructed and operative in accordance with a preferred embodiment of the present invention.

Reference is now made to FIG. 4, which is a simplified conceptual illustration of the multi-protocol authentication and authorization system of the present invention implemented as part of a converged application environment, constructed and operative in accordance with a preferred embodiment of the present invention. In the environment of FIG. 4 a client application 400 (represented pictorially as a computer on which client application 400 may reside) communicates via a network 402, such as the Internet, with an application server 404 in a cluster 406 of application servers, one of several clusters that is found in a clustering environment 408. A load balancing and routing mechanism 410 is provided for determining which server in which cluster an incoming message from client 400 should be routed. Each application server 404 may employ the request interceptor mechanisms described hereinabove in support of one or more converged applications hosted by application server 404. Each converged application preferably supports session affinity for incoming requests from client 400 using different transport protocols, where requests that are part of the same converged session, regardless of the transport protocol used, are directed to the application server where the session information resides. In accordance with conventional techniques, the converged application maintains the state of a session, while requests over different transport protocols for the converged application typically include encoded information that is used to maintain session affinity. Load balancing and routing mechanism 410 recognizes the session via the encoded information, such as in the form of a "cookie," received from client 400, and directs the request to the converged application. Session affinity for converged applications can be used to direct requests to the application server instance where the multi-protocol request interceptor shared memory state resides, allowing for multi-protocol authorization decisions as described hereinabove.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A multi-protocol authentication and authorization system comprising:
   a request interceptor configured to receive from a requestor a first request using a first transport protocol and a second request using a second transport protocol, wherein said first transport protocol and said second transport protocol are different transport protocols; and
   an authenticator for validating a digest received from said requestor,
   wherein said request interceptor is configured to authenticate said requestor if
   said digest is valid,
   a first criterion is applied to said first request,
   a second criterion is applied to said second request, and
   all of said criteria are met, and
   wherein said request interceptor is configured to constrain said requestor to one role in a requested application where said requests are made at different times not within a predefined time window, and a different role where said requests are made within a predefined time window.

2. A system according to claim 1 wherein said request interceptor is configured to authenticate one of said requests only subsequent to authenticating the other of said requests.

3. A system according to claim 1 wherein said request interceptor is configured to constrain said requestor to one role in said requested application where said requestor is authenticated for only one of said requests, and a different role where said requestor is authenticated for only the other of said requests.

4. A system according to claim 1 wherein said request interceptor is configured to constrain said requestor to one role in said requested application where said requestor is authenticated for only one of said requests, and a different role where said requestor is authenticated for both of said requests.

5. A method for multi-protocol authentication and authorization, the method comprising:
   receiving from a requestor a first request using a first transport protocol and a second request using a second transport protocol, wherein said first transport protocol and said second transport protocol are different transport protocols;
   validating a digest received from said requestor; and
   authenticating said requestor if said digest is valid and if
      a first criterion is applied to said first request,
      a second criterion is applied to said second request, and
      all of said criteria are met,
   wherein said request interceptor is configured to constrain said requestor to one role in a requested application where said requests are made at different times not within a predefined time window and a different role where said requests are made within a predefined time window, and
   wherein said receiving, validating, and authenticating steps are implemented in either of
      a) computer hardware configured to perform said steps, and
      b) computer software embodied in a tangible, computer-readable storage medium.

6. A method according to claim 5 wherein said authenticating step comprises authenticating one of said requests only subsequent to authenticating the other of said requests.

7. A method according to claim 5 wherein said authorizing step comprises constraining said requestor to one role in said requested application where said requestor is authenticated for only one of said requests, and a different role where said requestor is authenticated for only the other of said requests.

8. A method according to claim 5 wherein said authorizing step comprises constraining said requestor to one role in said requested application where said requestor is authenticated for only one of said requests, and a different role where said requestor is authenticated for both of said requests.

9. A computer program product for multi-protocol authentication and authorization, the computer program product comprising:
   a tangible, computer-readable storage medium; and
   computer program instructions operative to
      receive from a requestor a first request using a first transport protocol and a second request using a second transport protocol, wherein said first transport protocol and said second transport protocol are different transport protocols,
      validate a digest received from said requestor,
      apply a first criterion to said first request and a second criterion to said second request, and
      if said digest is valid and all of said criteria are met, authentication of authenticate said requestor and constrain said requestor to one role in a requested application where said requests are made at different times not within a predefined time window and a different role where said requests are made within a predefined time window,
   wherein said computer program instructions are stored on said computer-readable storage medium.

\* \* \* \* \*